United States Patent
Takita et al.

(10) Patent No.: US 6,858,968 B2
(45) Date of Patent: Feb. 22, 2005

(54) SYNCHRONOUS MOTOR, FAN, COMPRESSOR, REFRIGERATION AND AIR-CONDITIONING MACHINES

(75) Inventors: Yoshio Takita, Tokyo (JP); Hitoshi Kawaguchi, Tokyo (JP); Hayato Yoshino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/303,864

(22) Filed: Nov. 26, 2002

(65) Prior Publication Data

US 2003/0111927 A1 Jun. 19, 2003

(30) Foreign Application Priority Data

Dec. 19, 2001 (JP) .................................... 2001-386210

(51) Int. Cl.$^7$ ............................................. H02K 21/14
(52) U.S. Cl. .............. 310/261; 310/156.57; 310/156.49
(58) Field of Search .......................... 310/156.57, 156, 310/49, 261; H02K 21/14, 1/27, 0/19

(56) References Cited

U.S. PATENT DOCUMENTS 4,188,554 A * 2/1980 Binns ........................ 310/156
5,831,367 A * 11/1998 Fei .............................. 310/217
6,369,480 B1 * 4/2002 Nishiyama .............. 310/156.53
6,664,688 B2 * 12/2003 Naito et al. ............ 310/156.01

FOREIGN PATENT DOCUMENTS

| JP | 59209223 | * | 10/1984 | ............ H02K/1/22 |
| JP | 8-126273 | | 5/1996 | |
| JP | 9-191618 | | 7/1997 | |
| JP | 02001186699 | * | 7/2001 | ............ H02K/1/27 |
| JP | 2002051069 | * | 1/2002 | ............ H02K/1/27 |

* cited by examiner

Primary Examiner—Thomas M. Dougherty
Assistant Examiner—Iraj. A. Mohandesi
(74) Attorney, Agent, or Firm—Oblon, Spivak, McClelland, Maier & Neustadt, P.C.

(57) ABSTRACT

The conventional slit is symmetrically aligned with respect to the q-axis that is a direction where the magnetic flux is difficult to flow. Because of this, the generated magnetic flux must jump over the slit, whereas its jumping over position being dependent on the rotation of the rotor. This hinders a flow of the magnetic flux. This has caused problems such as making the efficiency worse and increasing the losses. Therefore, at least one pair of slits is constructed on the rotor, which forms the salient pole so as to obtain the d-axis (where the magnetic flux is easy to flow) and the q-axis (where the magnetic flux is difficult to flow). A low magnetic resistance parts having a small magnetic resistance are formed at these slits that are asymmetrically aligned with respect to the q-axis.

20 Claims, 13 Drawing Sheets

DETAIL OF PART B

SYNCHRONOUS MOTOR, FAN, COMPRESSOR, REFRIGERATION AND AIR-CONDITIONING MACHINES

BACKGROUND OF THE INVENTION

Field of the Invention

The drawing of FIG. 14 shows a cross-sectional view of the conventional 4-pole synchronous motor disclosed in the unexamined Japanese patent publication HEI 9-191618. The drawing of FIG. 15 shows a vertical section of the conventional synchronous motor of FIG. 14. The drawing of FIG. 16 shows a cross-sectional view of the rotor of the conventional synchronous motor of FIG. 14. Referring to the drawings, the reference numeral 1 denotes a rotor. The rotor 1 after laminating the steel in the axial direction, is fixed to the output shaft 3 by using the pressing method or by using the other likewise methods.

In addition to that, the reference numeral 9 denotes a stator. The stator 9 is formed by laminating the steel in the axial direction. In addition to that, the reference numeral 10 denotes windings wound around the stator 9. When an electric current is flown through the windings 10, then the electric current produces a rotating magnetic field. The reference numeral 12 denotes the plurality of slits radialy aligned so that the central part of the electric motor is protruding beyond. The slits 12 have air gaps inside them. Either that or the slits 12 are replenished with non-conductive, non-magnetic material inside them so as to magnetically isolate the plurality of magnetic circuits 13. Referring to FIG. 16, the reference numeral 14 denotes a thin connector unit. Various parts of the rotor 30 should not be completely disunited by the slits. As can be seen in detail at the Part B of FIG. 16, the slits 12 do not fully separate the outer periphery of the rotor 30. The strength of the rotor 30 is maintained by the adjustment of the thickness of the thin connector unit 14.

According to this kind of conventional electric motor, the position and direction of the magnetic circuit 13 on the rotor 30 determines the position and direction of the field magnetic flux that can exist in the rotor 30. When an exciting current flows through the windings 10 of the stator 9 so that the magneto motive force acts on the direction of the field magnetic pole of the rotor 30, then the field magnetic flux is produced in a direction of the field magnetic pole of the rotor 30, and the rotational force is applied to the rotor 30. Therefore, for the kind of electric motor illustrated in FIG. 14, the rotor 30 rotates by synchronizing to the rotating fields produced at the windings 10 of the stator 9, and by developing the reluctance torque.

Like above, the slits of the conventional rotor 30 is symmetrically arranged with respect to the q-axis. The q-axis is the direction where the magnetic flux is difficult to flow. Depending upon the position of a slit of the rotating rotor, the generated magnetic flux must jump over the slit. Because of this, the flow of magnetic flux becomes bad. There was a problem of the losses and the efficiency becomes worse.

In addition to that, typically, the rotor 30 of the conventional electric motor which is shown in FIG. 11 has 4 poles or more consisting of even number poles. For instance, when operating the 4-pole electric motor with commercial business power source supply of a constant frequency of 50 Hz or 60 Hz, its rotational speed is only increased from 1500 rpm to 1800 rpm (revolutions per minute). When equip this electric motor to the compressor and the like, then a decrease in its output causes a problem. Insufficient performance of the compressor is the problem.

As the methods of enlarging the ability of compressor are to increase the operational frequency in the drive circuit of the inverter and the like. Alternatively, there is a method of increasing the capacity of the compressor. In both cases there was a problem that the cost becomes high.

In addition to that, the conventional synchronous motor has not had the secondary conductor inside the slit. Because of this, self-starting of the conventional synchronous motor is not possible with commercial business power source supply, unlike the general induction electric motor. In order to start the synchronous motor, it must make a start by using the dedicated amplifier such as inverter. Henceforth, there was a problem that the expensive control unit becomes necessary.

In addition to that, the conventional electric motor had taken no consideration as regard to the proportion of the magnetic material to the non-magnetic material in the q-axis direction. Because of this, the conventional electric motor has been used under many occurrences of losses and when the efficiency has been bad.

According to present invention, it designates that the synchronous motor having a high efficiency is obtained as purpose. In addition to that, it designates that the synchronous motor attaining a high performance is obtained as purpose. In addition to that, it designates that the synchronous motor having a low manufacturing cost is obtained as purpose. In addition to that, it designates that the synchronous motor with a simple structure having a high reliability which can withstand the rotary motion at a full speed is obtained as purpose.

SUMMARY OF THE INVENTION

According to one aspect of the present invention, a synchronous motor comprises: at least a pair of slits constructed on a rotor, for forming a salient pole for obtaining a d-axis which is a direction in which a magnetic flux is easy to flow and a q-axis which is a direction in which the magnetic flux is difficult to flow. The slits are asymmetrically aligned with respect to the q-axis by installing to the slits a low magnetic resistance parts having a low magnetic resistance.

According to another aspect of the present invention, a synchronous motor comprises at least a pair of slits constructed on a rotor, which are replenished with a conductive material, for forming a salient pole for obtaining a d-axis which is a direction in which a magnetic flux is easy to flow and a q-axis which is a direction in which the magnetic flux is difficult to flow. A plurality of slots connected to at least one end of the slit in a d-axis direction, which are arranged at periphery of the slit, which are replenished with a conductive material, and for developing an induction torque. The slits are asymmetrically aligned with respect to the q-axis by installing to the slits a low magnetic resistance parts having a low magnetic resistance.

According to another aspect of the present invention, the synchronous motor includes the low magnetic resistance parts which are constructed by changing a widths of the slits.

According to another aspect of the present invention, the synchronous motor includes a connector bridge unit that connects the magnetic circuits between the slits formed by dividing the slits. The connector bridge unit is the low magnetic resistance part.

According to another aspect of the present invention, the synchronous motor comprises a plurality of the connector bridge units. Widths of the connector bridge units are gradually changed in a d-axis direction.

According to another aspect of the present invention, the synchronous motor comprises a plurality of slits. The adjacent slits of the plurality of slits are connected in a q-axis direction.

According to another aspect of the present invention, the synchronous motor includes the low magnetic resistance parts which are installed at the rotating and progressing direction side with respect to the q-axis.

According to another aspect of the present invention, the synchronous motor includes a proportion of other parts beside the slits and slits in a q-axis direction which is set as 1:1~3.

According to another aspect of the present invention, a synchronous motor comprises a rotor formed by laminating the rotor core, and formed by punching the magnetic material; and at least a pair of slits constructed on the rotor, which are replenished with a non-magnetic material, for forming a 2-pole salient pole having an angle between the d-axis and the q-axis of approximately 90 degrees. A proportion of the magnetic material to the non-magnetic material in a q-axis direction is set to a pre-determined proportion for minimizing the loss of electric motor.

According to another aspect of the present invention, the synchronous motor includes the pre-determined proportion which is set approximately to 1~3:1.

According to another aspect of the present invention, the synchronous motor further comprises slots constructed on the rotor for developing an induction torque.

According to another aspect of the present invention, the synchronous motor further comprises a shaft for transmitting a rotational force of the rotor. The shaft is made of a non-magnetic material.

According to another aspect of the present invention, the synchronous motor further comprises an end ring attached to an end of the rotor in its axial direction. The shaft and the end rings are molded as one body.

According to another aspect of the present invention, a synchronous motor includes a pole number which is 2-pole.

According to another aspect of the present invention, a fan comprises the synchronous motor as defined above.

According to another aspect of the present invention, a compressor comprises the synchronous motor as defined above.

According to another aspect of the present invention, a refrigeration and air-conditioning machines comprises the fan and the compressor as defined above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
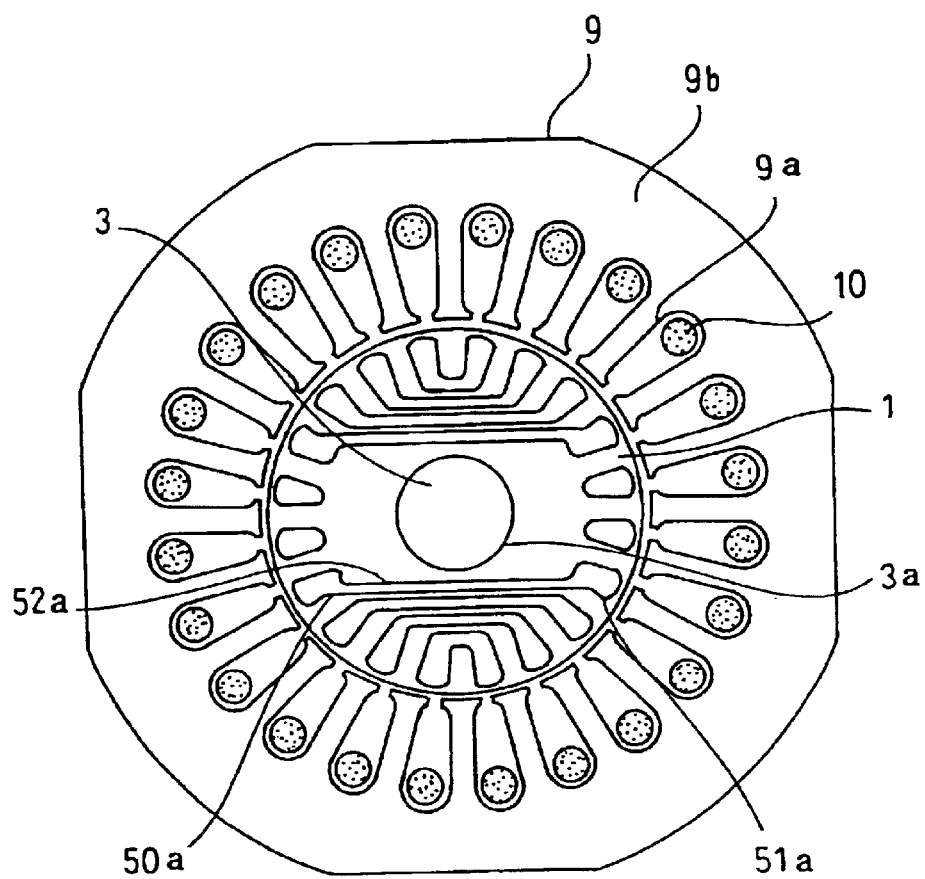
FIG. 1 shows a cross-sectional view of the rotor of the synchronous motor of the embodiment 1.

Reference will now be made in detail to the present preferred embodiments of the invention, examples of which are illustrated in the accompanying drawings, wherein like reference numerals indicate like elements throughout the several views.

Embodiment 1.

Figure 2:
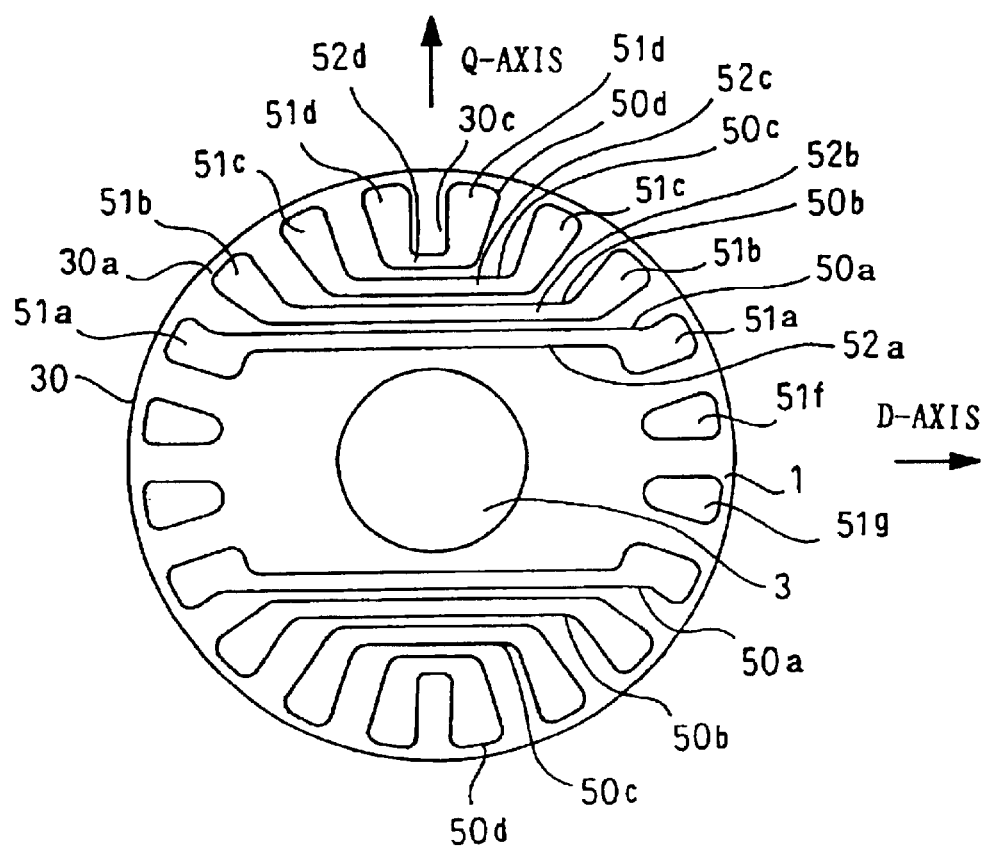
FIG. 2 shows a sectional view of the rotor of the synchronous motor of the embodiment 1.
Figure 3:
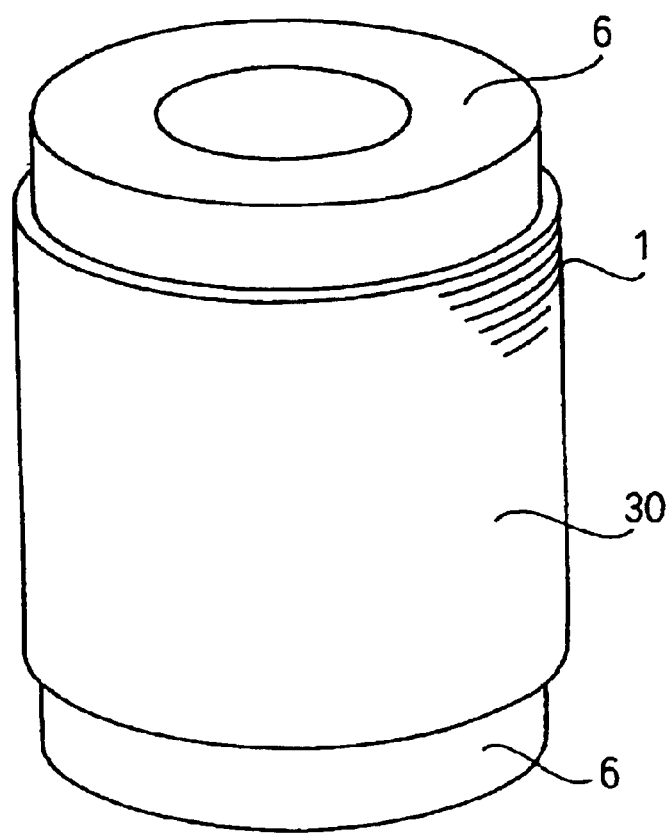
FIG. 3 shows an oblique view of the rotor of the synchronous motor of the embodiment 1.

Hereinbelow, the embodiment 1 of the present invention is described with reference to the drawings. The drawing of FIG. 1 shows a cross-sectional view of the synchronous motor of the embodiment 1. In addition to that, the drawing of FIG. 2 shows a sectional view of the rotor of the synchronous motor of the embodiment 1. In addition to that, the drawing of FIG. 3 shows an oblique view of the rotor of the synchronous motor of the embodiment 1. Referring to FIG. 1, the reference numeral 9b denotes a stator core made of electric steel, which is magnetic. The stator 9 is constructed by laminating and stacking a plurality of electric steels.

In addition to that, the reference numeral 10 denotes windings installed inside of a slot 9a of the stator core 9b. The reference numeral 1 denotes a rotor core made of electric steel, which is magnetic. The rotor 30 is constructed by laminating the rotor core 1. In addition to that, the reference numerals 50a, 50b, 50c, and 50d are the pairs of slits and slots replenished with conductive material such as aluminum inside them. The first pair of slit and slot 50a is situated innermost to the shaft 3. The second pair of slit and slot 50b is located at outside of the first pair of slit and slot 50a. The third pair of slit and slot 50c is located at outside of the second pair of slit and slot 50b. The fourth pair of slit and slot 50d is located at outside of the third pair of slit and slot 50c.

The first slit and slot 50a is constructed by the first slots 51a and the first slit 52a. The first slots 51a are connected to the both ends of the first slit 52a. Likewise, the second slit and slot 50b is constructed by the second slots 51b and the second slit 52b. The third slit and slot 50c is constructed by the third slots 51c and the third slit 52c. The fourth slit and slot 50d is constructed by the fourth slots 51d and the fourth slit 52d. In addition to that, the reference numeral 3 denotes a shaft which is fixed to the shaft insertion hole 3a (not illustrated) of the rotor 30 by using the pressing method or the shrinking method. The shaft 3 is situated at the center of the rotor core 1.

In addition to that, referring to FIG. 2, a plurality of slots 51a, 51b, 51c, 51d, 51f, and 51g are radialy and equally aligned with respect to the center of the rotor core 1. The induction torque is developed. The slits 52a, 52b, 52c, and 52d of the slits and slots 50a, 50b, 50c, and 50d are linearly and continuously connected in between the slots 51a, 51b, 51c, and 51d. The slits are approximately parallel to the d-axis. This is done so in order to obtain the d-axis is the direction where magnetic flux is easy to flow. The q-axis is the direction where magnetic flux is difficult to flow. The slits 52a, 52b, 52c, and 52d are constructed so that the d-axis and the q-axis intersect approximately at the center of the rotor core 1. In other words, the slits and slots are formed by the slots being connected to both ends of the elongated direction (that is, direction of the d-axis) of the slit.

The pairs of slits 52a, 52b, 52c, and 52d of the slits and slots 50a, 50b, 50c, and 50d are arranged linearly and continuously to the d-axis which is located at approximately center of the rotor core 1. The slits are approximately parallel to the d-axis. In the drawing, the d-axis is the direction where magnetic flux is easy to flow. The q-axis is the direction where magnetic flux is difficult to flow. Both ends of the fourth slit 52d at the elongated direction are connected to the fourth slots 51d approximately parallel to the q-axis. The fourth slots 51d and the fourth slit 52d are U-shaped.

Because of this, after the fourth slots 51d and the slit 52d are punched, the resulting shape of the rotor core 1 is protruding beyond, that is, it has a protruding unit 30c at the central direction.

In addition to that, referring to FIG. 3, the reference numeral 30 denotes a rotor. The reference numeral 6 denotes the end rings made of aluminum which is a conductive material. The end rings 6 are mounted at both ends of the rotating axis of the laminated rotor core 1 by using the aluminum die-casting method. A squirrel-cage shaped secondary conductor is formed by the end rings 6 mounted at both ends of the axis of the laminated rotor core 1 and by the aluminum material replenished in the slots 51a, 51b, 51c, 51d, 51f, and 51g of the slits and slots 50a, 50b, 50c, 50d of the rotor 30. These slots are replenished with aluminum material inside them. The electric motor is started by the flow of electric current through the secondary conductor to develop the induction torque.

In other words, the slots 51a, 51b, 51c, 51d, 51f, and 51g are replenished with non-magnetic and conductive material such as aluminum. The secondary currents flow through the slots in order to develop the induction torque during start-up or during the asynchronous rotary motion of the electric motor. The slits 52a, 52b, 52c, and 52d are replenished with non-magnetic and conductive material such as aluminum just like the slots 51a, 51b, 51c, 51d, 51f, and 51g. In the present embodiment, the slits 52a, 52b, 52c, and 52d and the slots 51a, 51b, 51c, and 51d are connected together by punching as one body to construct the slits and slots 50a, 50b, 50c, and 50d.

The pairs of slits and slots 50a, 50b, 50c, and 50d of the rotor 30 are replenished with non-magnetic aluminum. In addition to that, according to the rotor 30 of the present embodiment, the slits and slots 50a, 50b, 50c, and 50d are constructed to have a directivity. The directivity is the direction of the d-axis (the magnetic flux is easy to flow) and the q-axis (the magnetic flux is difficult to flow). For instance, in the case of 2-pole configuration, a pre-determined angle (at a mechanical angle) between the d-axis and the q-axis is set as 90 degrees. Therefore, the magnetic flux generated at the stator 9 forms a salient pole depending on the position of the rotor 30.

In the present embodiment, the slits arranged as such have the pre-determined angle between the of d-axis and q-axis set as 90 degrees. The 2-pole synchronous motor having 2-pole salient pole is formed accordingly.

Herewith, the strength of the rotor 30 against the centrifugal force is maintained by the narrow unit 30a at the outer periphery of the rotor 30, which partially connects various parts of the rotor 30 so that the rotor 30 is not completely separated after having installed various slits and slots.

Figure 4:
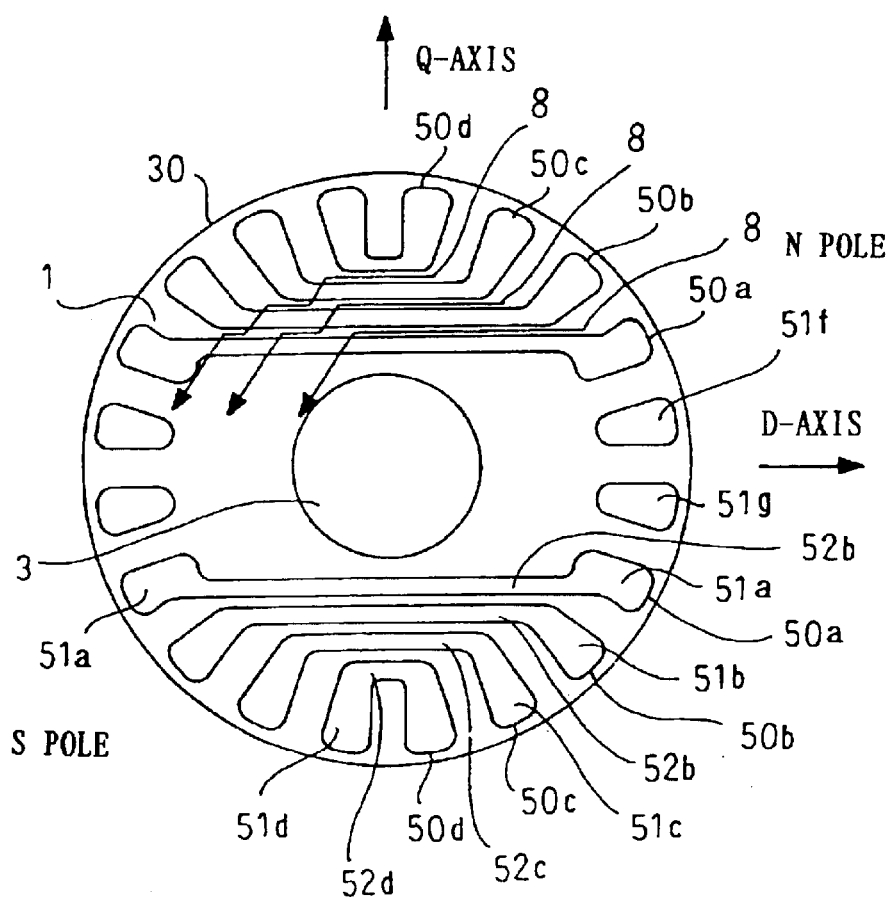
FIG. 4 shows a sectional view of the rotor of another synchronous motor of the embodiment 1.

The magnetic flux shall be described next. The drawing of FIG. 4 shows a sectional view of the rotor of another synchronous motor of the present embodiment. Normally, if the N pole generated at the stator 9 is occurring on the d-axis line (that is, if the N pole occurs on the elongated direction of the slit), the slit which is the magnetic resistance does not hinder the magnetic flux such that the magnetic resistance is minimal. In addition to that, if the N pole positions on the q-axis line, then the magnetic flux must pass through the slit which is the magnetic resistance such that the magnetic resistance is maximal.

In other words, the direction of low magnetic resistance is said to be d-axis. The direction of maximum magnetic resistance is said to be q-axis. When the direction of N pole is either on the d-axis or q-axis, a torque that make the rotor spin does not occur. However, if the magnetic pole (N pole) is not occurring on the d-axis or q-axis, then the torque that makes the rotor spin is produced. The torque output size changes depending on the position of N pole with respect to the direction of d-axis or q-axis. The rotor 30 rotates by synchronizing to a delayed position from the rotating electric field generated by the stator 9, by an angle of rotation sufficient enough to produce a torque that balances with a size of the load applied to the rotor 30.

When the motor operates in synchronism while an arbitrary load is applied to the rotor 30, the motor rotates the rotor 30 by an angle of rotation sufficient enough to produce a torque that balances with the load applied to the rotor 30. The synchronized rotation of the rotor 30 takes place accordingly. Referring to FIG. 4, if the direction of magnetic field that occurred at the stator 9 (that is, rotating from N pole to S pole); the rotation direction is from upper right to lower left. The magnetic flux 8 that occurs at the stator 9 enters from upper right direction (rotating counterclockwise by a rotation angle for FIG. 4) of the rotor 30 and moves towards the opposite pole (S pole) of the stator 9 from the lower left.

In other words, as for the 2-pole synchronous motor illustrated in FIG. 4, if the N pole position of the stator 9 has deviated from the d-axis or the q-axis, since the magnetic flux 8 is magnetically isolated by the slits 52a, 52b, 52c, and 52d of the rotor 30, so that the magnetic flux 8 cannot reach the S pole in a straight line. The S pole is positioned at 180 degrees away from the N pole. Such that the magnetic flux 8 flows through the magnetic circuit (for instance, between the slit 52*a* and slit 52*b*). The magnetic flux 8 must jump over the slit in the mid-way in order to flow to the opposite magnetic pole; namely, the S pole.

At this time, because the rotor 30 is magnetically isolated by the slit, the magnetic flux 8 flows through the magnetic circuit between and along the slits. At a certain locality, a part of the magnetic flux must pass through the slit (in other words, jumps over the slit) and proceeds to the S pole side. The amount of magnetic flux and its position of passing through (in other words, jumping over) the slit change by such factors as a size of the magnetic field of the stator 9, a torque being produced by the rotor 30, and shapes of the slits and slots. However, the jumping over position of the magnetic flux is yet uncertain.

Depending on the size and the position of the magnetic flux 8 that jumps over the slit, the loss of the rotor 30 increases due to the magnetic flux 8 jumping over the slit. This causes a decline in the efficiency of the synchronous motor. Henceforth, the adjustment of jumping over position of the slit in such a way as to minimize the loss of the rotor 30 enables to control the loss occurrence and prevents the decline in efficiency due to change in loads.

Figure 5:
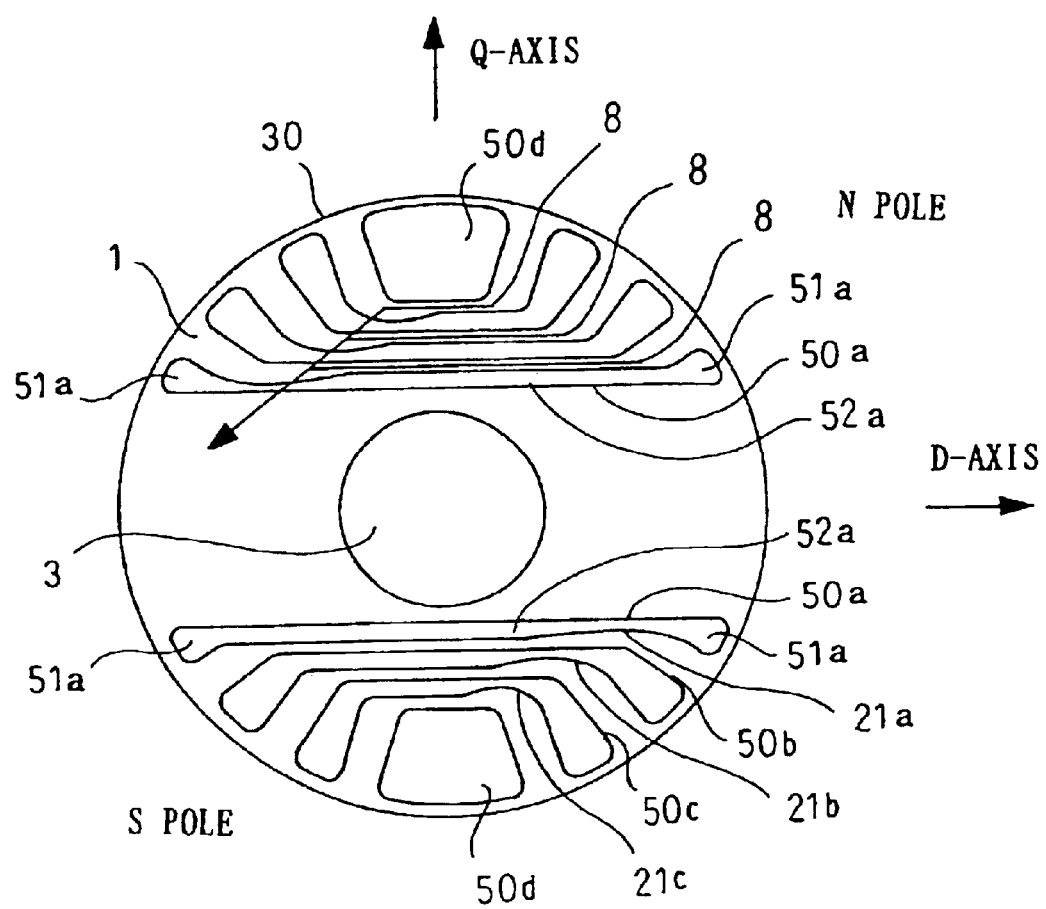
FIG. 5 shows a sectional view of the rotor of another synchronous motor of the embodiment 1.

The drawing of FIG. 5 shows an example of another rotor of the present embodiment. During the synchronism operation of the rotor under the condition of appropriate torque occurring, the magnetic flux 8 generated at the stator 9 is not found at the d-axis direction nor at the q-axis direction. The magnetic flux 8 is found at the position deviated from the d-axis and q-axis by a pre-determined angle in the rotating direction. At this time, since the magnetic flux 8 generated from the N pole is magnetically isolated by the slit as described in FIG. 4, such that the magnetic flux 8 is difficult to flow in the progressive direction (i.e., to the S pole), therefore it flows through the magnetic circuit between and along the slits, and at a certain locality it jumps over the slit to flow to the S pole side.

Herewith, in the present embodiment, as shown in FIG. 5, the narrow units 21*a*, 21*b*, and 21*c*, each having a small width, are prepared. This is one part of the slit having a low magnetic resistance. Because the narrow units 21*a*, 21*b*, and 21*c* having a low magnetic resistance in the slit has a low magnetic resistance, the magnetic flux 8 that advances through the magnetic circuit between and along the slits passes through (i.e., jumps over) the narrow units 21*a*, 21*b*, and 21*c* is easy to flow. Henceforth, the jumping over position of the magnetic flux 8 can be controlled to be confined at the low magnetic resistance part. Because of this, a flow of the magnetic flux is fixed to a specific position (i.e., the narrow unit). The flow of magnetic flux is stabilized. The rotation of the rotor 30 is stabilized. In addition to that, the narrow unit can be adjusted to a position where the loss occurring due to the magnetic flux 8 jumping over the slit is minimal. The efficiency of the electric motor is improved this way.

Herewith, the position of installing the narrow unit which is the low magnetic resistance part is better of installed at the rotating and progressing direction side in order to achieve a smooth flow of the magnetic flux 8. (As for the case of FIG. 5, for those slits positioned at upper side of the d-axis, the narrow unit is better of installed at the left hand side of the q-axis, and for those slits positioned at lower side of the d-axis, it is better of installed at the right hand side of the q-axis.) This effectively decreases the loss. Highly efficient synchronous motor is obtained this way.

In addition to that, the asymmetrical arrangement of the slits (by installing to the slits of the rotor 30 the narrow unit which is the low magnetic resistance part to one side of the rotating and progressing direction side of the q-axis) enables the magnetic flux 8 to pass through the specific position (that is, the low magnetic resistance part) for an improved efficiency of the electric motor. This way, the characteristics and the efficiency of the electric motor are improved.

The example of asymmetrical arrangement of the slits is described by installing the narrow unit which is the low magnetic resistance part to one side of the rotating and progressing direction side of the q-axis for the pairs of the slits installed with respect to the d-axis. Depending on the usage conditions and characteristics of the electric motor, the part on the slit where the magnetic flux 8 should not pass through can be made thick. In addition to that, the narrow unit which is the low magnetic resistance part can be installed to all the slits. Otherwise, the narrow unit can be installed only to those slits that affect the efficiency improvements. As long as it is in the position of optimal motor efficiency, and as long as the flow of magnetic flux 8 which is generated from the stator 9 is controlled to be confined to a specific position for improving the efficiency, the low magnetic resistance part can be installed anywhere on the slits.

Herewith, following case is likely to occur by controlling the specific position of the magnetic flux 8 passing for the improved efficiency. It is the case of reduced copper loss of the rotor 9 but increased iron loss which is one of the losses of the rotor 30. However, as long as the overall losses of the electric motor is reduced, control of the passing position of the magnetic flux as described above is preferably carried out since it increases the efficiency of the electric motor. Accordingly, by considering the balance of the copper loss and the iron loss resulting from various load conditions and characteristics as the electric motor, the flow of magnetic flux is controlled by installing the low magnetic resistance part to the slit and by modifying the slit alignment to be asymmetrical with respect to the q-axis.

Figure 6:
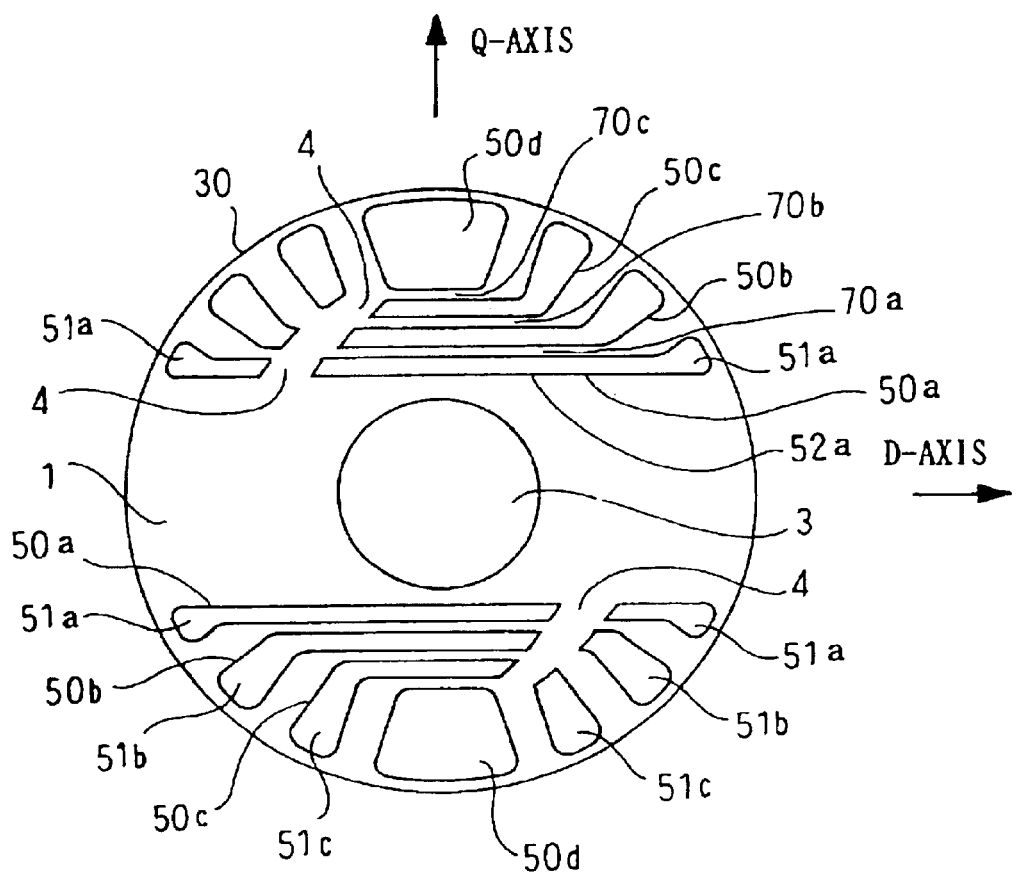
FIG. 6 shows a sectional view of the rotor of another synchronous motor of the embodiment 1.

In addition to that, according to the present embodiment, we have described the case of installing the narrow unit by making a part of the slit thin as the low magnetic resistance part. However, as indicated in the drawing of FIG. 6, the same effect is obtained by configuring a connector bridge unit which is also the low magnetic resistance part made possible by separating apart the slit situated at the minimum loss position, and by connecting the magnetic circuit between the divided slits. FIG. 6 shows a sectional view of the rotor of another synchronous motor of the present embodiment. Refer to FIGS. 1, 2, 3, 4, and 5 for the description of equivalent reference numerals. Referring to FIG. 6, the reference numeral 70*a* denotes a magnetic circuit between the slits 52*a* and 52*b*. The reference numeral 70*b* denotes a magnetic circuit between the slits 52*b* and 52*c*. The reference numeral 70*c* denotes a magnetic circuit between the slits 52*c* and 50*d*. The magnetic circuits 70*a*, 70*b* and 70*c* are joined together by the connector bridge unit 4. The connector bridge unit 4 is constructed as a part of the rotor core 1. Therefore, the magnetic resistance is minimal and the magnetic flux 8 is easy to flow than the slits.

According to the present embodiment, the connector bridge unit 4 connects the magnetic circuits 70*a*, 70*b*, and 70*c* formed between the slits. The connector bridge unit 4 is formed at the position of low magnetic resistance (also it is the minimum loss position). When the magnetic flux 8 generated at the stator 9 passes through the connector bridge unit 4, the flow of magnetic flux 8 is controlled to a minimum loss part, and its flow is improved. The electric motor is efficiently operated under such improvement in the flow of the magnetic flux. In addition to that, the increased strength of the rotor 30 is attained by creating the connector bridge unit 4 of which is the low magnetic resistance part. The strength against the centrifugal force is improved such that this contributes to the improvement in a reliability of the electric motor. In the present embodiment, the ideal position of forming the connector bridge unit 4 is the position away from the rotating and progressing direction side of the q-axis as much as possible (in other words, left hand side of the q-axis for those upper slits close to the d-axis of FIG. 6).

As above, by improving the specific position of the minimum loss of the flow of magnetic flux by installing the low magnetic resistance part, the amount of electric current that flows through the windings of the stator 9 decreases compared to the case of not improving. This way, a highly efficient electric motor is implemented. The shape and position of the slits is appropriately changed to the minimum loss position considering the usage conditions and characteristics of the electric motor. A high efficiency is possible this way to any synchronous motor.

Figure 7:
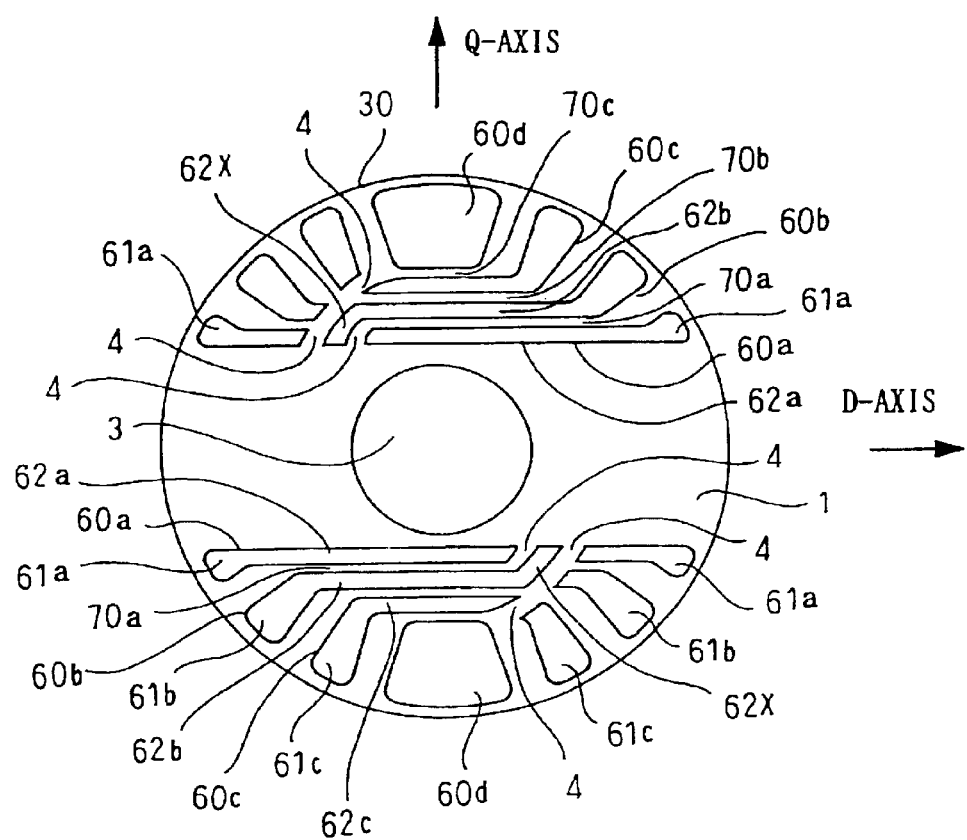
FIG. 7 shows a sectional view of the rotor of another synchronous motor of the embodiment 1.
Figure 8:
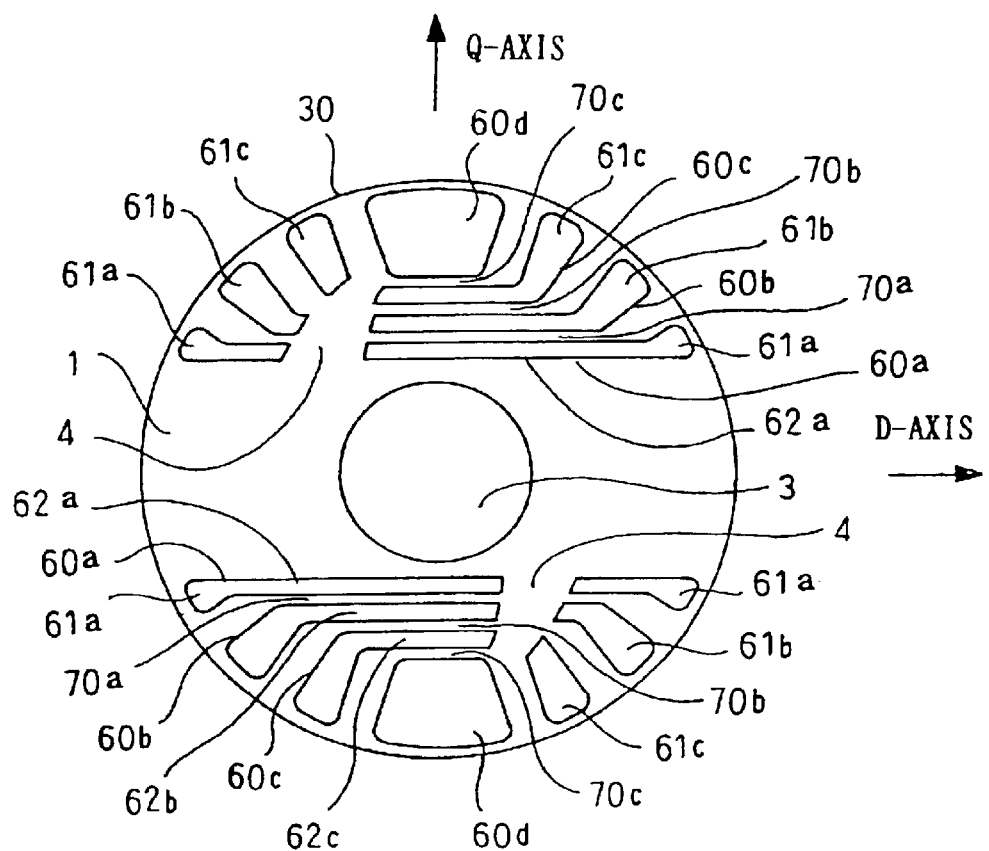
FIG. 8 shows a sectional view of the rotor of another synchronous motor of the embodiment 1.
Figure 9:
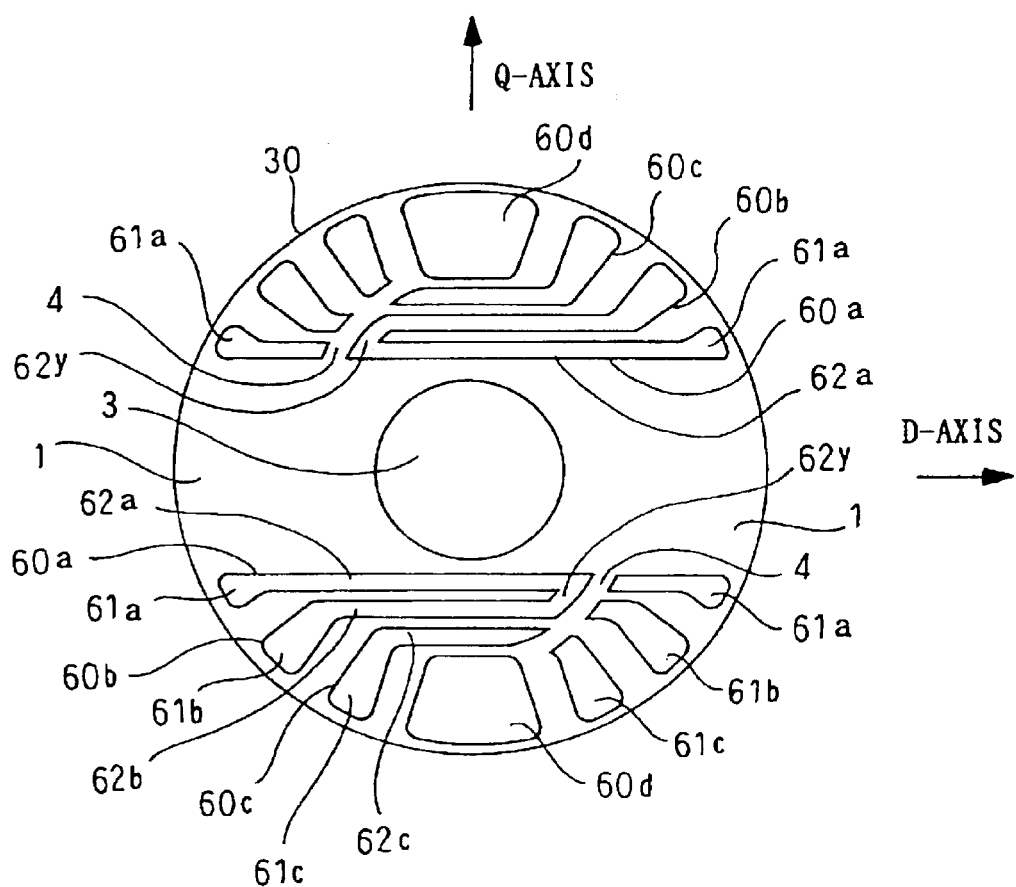
FIG. 9 shows a sectional view of the rotor of another synchronous motor of the embodiment 1.

In addition to that, as indicated in the drawings of FIGS. 7, 8 and 9, the same effect is obtained even if the shapes and direction of the slits are modified for making the flow of magnetic flux smooth at the minimum loss position. FIGS. 7, 8, and 9 show the sectional views of the rotors of other synchronous motors for the present embodiment. Refer to FIGS. 1, 2, 3, 4, 5, and 6 for the description of the equivalent reference numerals.

Referring to FIGS. 7, 8, and 9, the reference numerals 60a, 60b, and 60c denote slits and slots. The reference numerals 61a, 61b and 61c are the slots. The reference numerals 62a, 62b, and 62c are the slits. Referring to FIG. 7, the slit 62b is divided by the connector bridge unit 4 which is the low magnetic resistance parts at the minimum loss position, and is formed in order to allow for the smooth flow of the magnetic flux. At the connector bridge unit 4, the direction of the divided edge unit 62X of the slit 62b is changed to the flow direction of the magnetic flux. In addition to that, likewise, the slit 62c has a pointed end unit which has gradually narrowed down the shape of the divided edge unit 62X towards the direction of the flow of the magnetic flux so that the magnetic flux readily flows. By doing so, the magnetic circuit between the slits is formed in such a way as for the magnetic flux is easy to flow, therefore, the magnetic flux readily flows. The highly efficient electric motor having reduced the loss is obtained.

Herewith, the magnetic flux created at the stator 9 flows through the magnetic circuits between the slits of the rotor 30, and flows to the connector bridge unit 4 which is the minimum resistance part, and the magnetic flux flown through the magnetic circuits 70a, 70b, and 70c between various slits are joined at the connector bridge unit 4, therefore, the amount of magnetic flux at the connector bridge unit 4 increases. Therefore, as shown in FIG. 8, by gradually widening the size (width) of the connector bridge unit 4 which is the minimum resistance unit in the direction of the magnetic flux, a saturation of the magnetic flux at the connector bridge unit 4 which is the low magnetic resistance part is decreased. Henceforth, the copper loss of the electric motor is reduced and the efficiency is improved. In FIG. 8, the width of the connector bridge unit 4 which is the low magnetic resistance part is gradually widened towards the direction of magnetic flux (in other words, the width is widened to the upper right from the lower left at the connector bridge unit 4 at upper side of FIG. 8). However, the shape of the connector bridge unit 4 can appropriately be constructed so that the characteristics of the electric motor improve depending on the usage conditions and the characteristics of the electric motor.

In addition, as shown in FIG. 9, the slit of the rotor 30 is divided. The slit is joined at the connector bridge unit 4 which is the low magnetic resistance part. Further, the slits 62a and 62b are joined together at the slit connector unit 62Y. This increases the amount (volume) of filler material such as aluminum replenished inside the slits and slots. The secondary resistance of the rotor 30 gets small when the amount of filler material such as aluminum increases. The highly efficient electric motor is obtained this way.

Herewith, in principle, the synchronous motor having the slits and slots provides the induction torque at the slots 61a, 61b, and 61c upon start-up such that the secondary current flows at the slots 61a, 61b, and 61c. However, the secondary current does not flow through the slots during the synchronism operation. In practice, a harmonic current (due to the power source supply distortion) flows through the slits and slots. Because of this, the loss occurs due to the harmonic current even during the synchronism operation. The loss is lightened by reducing the secondary resistance. Since the secondary resistance is deduced by installing the slit connector unit that joins the slits, therefore the highly efficient electric motor is achieved. The installation position of the slit connector unit is selected, and which slit are to be joined to which other slit is selected so that the loss of the electric motor would be small (in other words, highly effective) depending on the usage conditions and the characteristics of the electric motor.

In addition to that, even if the shapes of the slits are modified as described above, only the metallic mold of the rotor 30 need be replaced. The manufacturing process itself remains intact. It can be manufactured under the equivalent cost as before offering a low manufacturing cost synchronous motor solution.

In addition to that, the present embodiment has described the example that uses aluminum material as the filler. The same effect is obtained by using any other non-magnetic and electric conductive materials such as copper and the like.

In addition to that, in the example of the present embodiment, the same material (eg. aluminum) is replenished to both slits and slots. The same effect is obtained by using different materials for the slits and slots. In this case, for example, the slots are replenished with aluminum by using the die-casting method. Material such as copper is replenished to the slits by using the die-casting method. In the case of replenishing with different materials to the slits and slots, a cover is required so that the filler materials are not mixed during the manufacturing stage. For instance, when replenishing with the filler material to the slot, a cover is installed so that the filler material of the slot does not intrude the filler material of the slit. With this cover, the filler materials of the slit and slot are definitely separated. In this case, the material to be replenished to the slit does not necessary has to be a conductive material.

Accordingly, by replenishing the slits and slots with different filler materials, a considerable freedom in choosing the filler materials is provided. The cost is deduced. Furthermore, application of innovative use of materials as such yields many options concerning the characteristics of the electric motor. Herewith, by completely separating the slits and slots, there is no need for the cover upon replenishing with different materials. Less costly electric motor can also offer simplicity in the manufacturing process.

In addition to that, according to the present embodiment, the non-magnetic, electrically conducting material is described as a filler. The same effect is obtained by injecting or replenishing the slit with magnetic material such as magnet having a low magnetic permeability. Leave a space open in the slit instead of replenishing with the filler material, and the magnet shaped exactly same as the open space in the slit is inserted there.

In addition to that, according to the synchronous motor of the present embodiment, it has slots in the rotor 30. Therefore, the windings 10 of the stator 9 are connected to the commercial power supply of a constant frequency of 50 Hz or 60 Hz to operate the electronic motor without relying on the external source such as a special startup device used in starting the synchronous motor. A low-cost electric motor is possible. What is more, the slits are installed so that the rotor 30 has 2-pole salient pole; therefore, the synchronous operation is carried out. Slip does not occur unlike the conventional induction electric motor. Therefore, the number of rotation during operation when the power supply is a constant frequency of 50 Hz or 60 Hz, the synchronous rotation number is 3000 rpm or 3600 rpm. The number of rotation can further be increased by the amount of slip rotation (about several %).

In addition to that, according to the synchronous motor of the present embodiment, the number of poles is set to 2. The rotation number of 2-pole configuration is much larger than the rotation number of the synchronous motor which sets the number of poles to 4. In other words, in the case of 4-pole configuration, and if the commercial business power source supply is a constant frequency of 50 Hz or 60 Hz, only half of the revolution of the 2-pole is attained, which is 1500 rpm or 1800 rpm at synchronism. Since the configuration of the present embodiment is 2-pole, the revolution can reach 3000 rpm to 3600 rpm. The revolution number of the motor is increased to obtain the high output motor.

In addition to that, as is apparent from the construction of the rotor of the synchronous motor of the present embodiment, it can be manufactured using the same aluminum die-casting method as the conventional induction motor. No extra cost is incurred upon manufacturing the synchronous motor of the present invention.

In addition to that, the slots installed at the periphery of the rotor 30 are radialy aligned approximately equidistance from one another. The induction torque is further increased. The slots being installed accordingly also provide a stabilizing influence on the electric motor as it approaches synchronism. A highly reliable synchronous motor is obtained this way.

In addition to that, the pairs of slots 52a, 52b, 52c, and 52d are approximately in straight lines; therefore, the magnetic flux can flow through them easily to obtain a highly efficient electric motor. In addition to that, the pairs of slits are placed approximately in parallel line against the d-axis which is the direction of magnetic flux easy flow, consequently, the magnetic flux readily flows through them to control the overheat of the electric motor such that burn out damage of the windings is prevented to obtain a highly reliable electric motor.

In addition to that, according to the present embodiment, the case of 2-pole is described. The same effect is obtained by using the pole number greater than 2 (that is, 4-pole and 6-pole).

Herewith, according to the synchronous motor of the present embodiment, the slits and slots are replenished with non-magnetic material. The cost is kept down since the magnet which is quite expensive is not used. In addition to that, since the magnet is not being used, the magnet will not stick to the device upon disassembling the device itself. Therefore, the disassembled parts can be recycled easily.

Now, according to the present embodiment, the case of 4 pairs of slits is described. The same effect is obtained even if the pairs of slits are not 4. In addition to that, we have also described regarding the aluminum used as the electrically conductive material. The similar effect is obtained by using other materials such as copper, copper alloys, glass, stainless steel and the like. For instance, when the copper is used as the material, since the copper has low resistance than the aluminum material, such that the resistance of the squirrel-caged secondary conductor becomes low, and therefore, the characteristics of the synchronous motor from the start-up to pulling into synchronism is improved.

In addition to that, according to the synchronous motor using the rotor 30 of the present embodiment described above, the secondary copper loss of the rotor does not occur during the synchronism operation, and the highly efficient operation is possible, therefore, it is ideally adapted to fans, compressors, air conditioners, refrigeration and air-conditioning machines of the refrigerator etc.

In addition to that, according to the synchronous motor of the present embodiment, the conductor material being used has a low resistance. By doing so, a time taken from the start-up to reach the synchronous rotation number is made short. The high and ideal performance synchronous motor provides minimum vibration and noise. Application of this synchronous motor to compressor guarantees a minimum vibration and a low noise compressor. In addition to that, since the electric motor of the present embodiment and the compressor which loaded this electric motor have minimum vibration, when applied to the refrigeration and air-conditioning machines, a highly reliable refrigeration and air-conditioning machines without the fracture and vibration occurring in the piping system is possible. In addition to that, since they have minimum vibration and noises, the prevention units such as vibration proofing device and soundproofing device are not required. Low-cost, highly-reliable refrigeration and air-conditioning machines are obtained this way.

Embodiment 2

Figure 10:
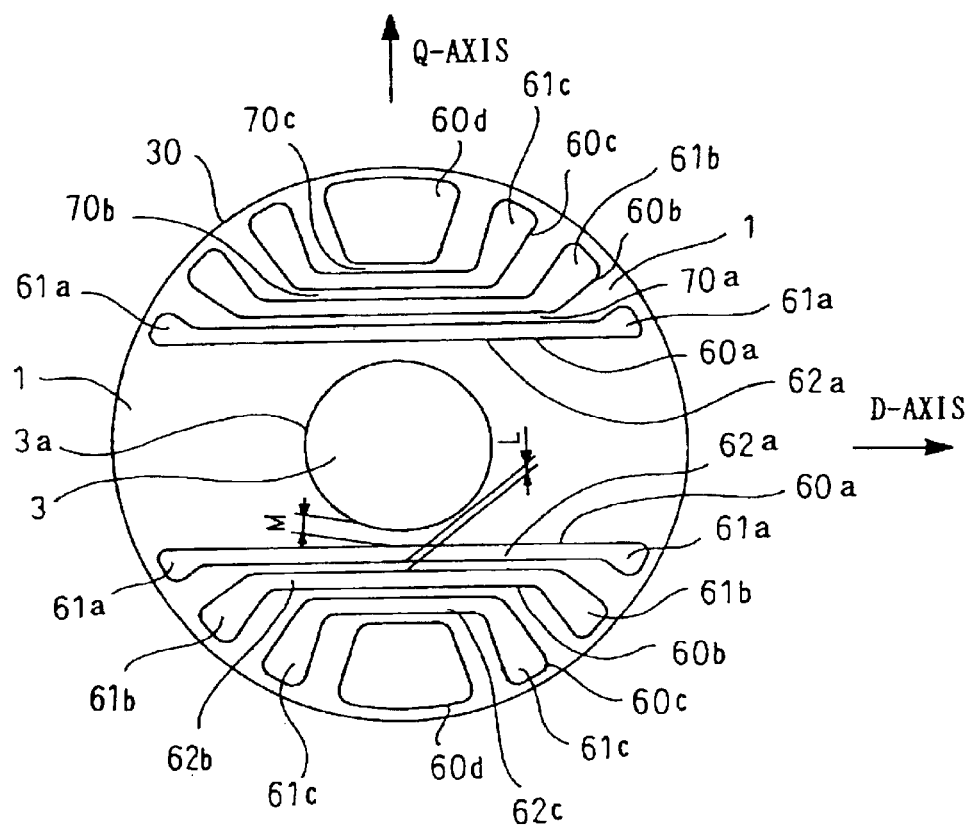
FIG. 10 shows a sectional view of the rotor for explaining the width of magnetic material and non-magnetic material.
Figure 11:
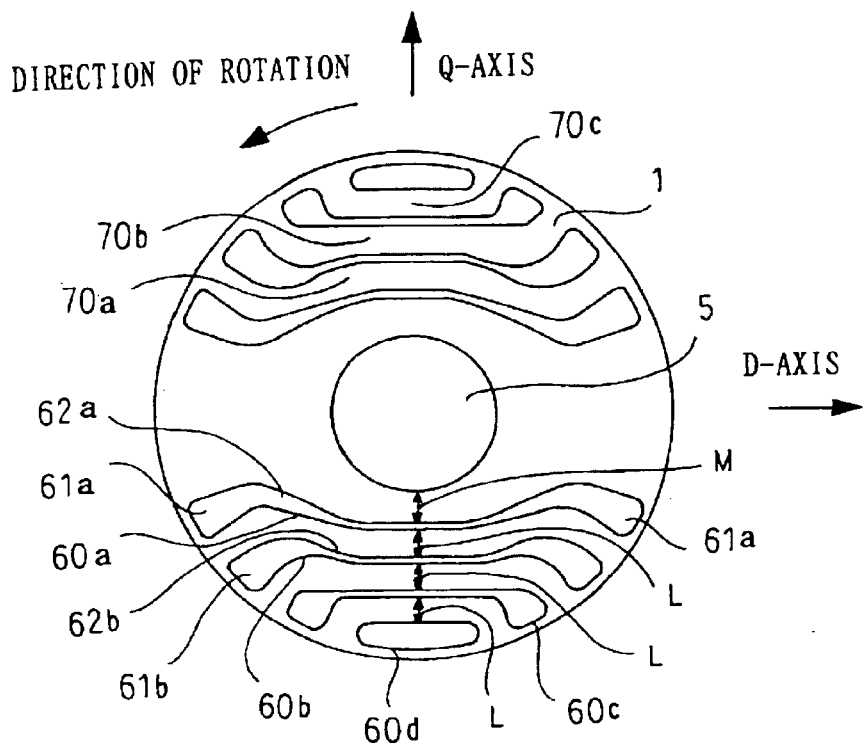
FIG. 11 shows a sectional view of the rotor of the synchronous motor of the embodiment 2

The drawing of FIG. 10 shows a sectional view of a rotor for describing about the widths of magnetic material and non-magnetic material. The drawing of FIG. 11 shows a sectional view of a rotor of the synchronous motor of the embodiment 2. Refer to the embodiment 1 for the description of equivalent reference numerals of FIGS. 10 and 11. According to the present embodiment, a non-magnetic material is used to make the shaft of the rotor described in the embodiment 1.

Referring to FIG. 10, the reference numeral 1 denotes a rotor core. The rotor core 1 is made of magnetic electrical steel. The rotor core 1 are laminated to form the rotor 30. The reference numerals 60a, 60b, and 60c are slits and slots replenished with non-magnetic conductive material such as aluminum. The reference numerals 62a, 62b, and 62c are the slits. The reference numerals 61a, 61b, and 61c are the slots. A letter L denotes the following widths in q-axis direction: a width of magnetic circuit 70a between the slit 62a and slot 62b; a width of magnetic circuit 70b between the slit 62b and slot 62c; and a width of magnetic circuit 70c between the slit 62c and the slit and slot 62d. A letter M denotes a width of magnetic rotor core 1 between the shaft 3 and the slit 61a. Here, as described in the embodiment 1, the slits 62a, 62b, and 62c do not have to be aligned in a straight line, therefore, according to the present embodiment, and as shown in the FIG. 11, the shaft 5 is inserted at the center, and the slits have rounded open shape facing the d-axis direction as if it surrounds the shaft 5.

Herewith, according to the present embodiment, the shaft 5 is made of non-magnetic material such as aluminum and stainless steel. The shaft 3 of the rotor 30 described in the embodiment 1 is a magnetic material such as iron. The shaft 3 is fixed to the shaft insertion hole 3a by using the shrinking method or the pressing method. Such that the slit cannot be constructed where there is shaft 3. The proportion of the magnetic material to the non-magnetic material when viewed from the q-axis, the magnetic material proportion gets extremely large because of the shaft 3. In regard to the proportion of the magnetic material to the non-magnetic material, it is ideal to set the pre-determined proportion to obtain the maximum operating efficiency. Accordingly, it is ideal to select the pre-determined proportion based on the analysis and from the experimental results in order to make the motor input small.

Herewith, the pre-determined proportion of magnetic material to non-magnetic material of the highly efficient motor worked out by conducting an experiment is found to be 1~3:1. According to the experiment, the pre-determined proportion of 1~3 (magnetic material):1 (non-magnetic material) was ideal. Therefore, according to the present embodiment, the shaft 5 is constructed using the non-magnetic material using the worked out proportion of magnetic material:non-magnetic material of 1~3:1 as much as possible. Since the shaft 5 itself is non-magnetic, the parts other than the shaft 5, which are magnetic, should be made larger when constructing the non-magnetic shaft 5 so that the magnetic:non-magnetic 1~3:1 proportion is approached. Thus, there is no need to make the width of the magnetic material component in the q-axis direction small.

In other words, the shaft 3 is made of magnetic material such as iron in the previous times. The proportion of magnetic material to non-magnetic material is set as 1~3:1. The width of the magnetic material component in the q-axis direction is made small in order to improve on the operating efficiencies, and the width of the non-magnetic component in the q-axis (that is, the slits) must be made larger. However, in the present embodiment, since the shaft 5 is non-magnetic, there is no need to increase the width of q-axis direction of the non-magnetic component (that is, the slits). On contrary, there is a need to increase the magnetic component. The strength between the slits and slots (that is, the magnetic component) of the rotor core 1 after punching the slit and slots is increased. The motor is therefore highly reliable.

Herewith, according to the conventional electric motor, and as illustrated in FIG. 10, the L widths in q-axis direction are: a width of magnetic circuit 70a between the slit 62a and slot 62b; a width of magnetic circuit 70b between the slit 62b and slot 62c; and a width of magnetic circuit 70c between the slit 62c and the slits and slot 62d. The M width of magnetic rotor core 1 is between the shaft 5 and the slit 62a. There is a need for securing the strength of the rotor in order to prevent it from deformation resulting from punching. Therefore, these values cannot be made too small. Such that the actual proportion of the magnetic material to the non-magnetic material differ from the pre-determined proportion. There was a likelihood that the proportion of the non-magnetic material ends up larger than the proportion of the magnetic material. These may have affected the operating efficiencies.

Nevertheless, in the present embodiment, as illustrated in FIG. 11, the non-magnetic stainless steel is used to make the shaft 5. In contrast to the case of FIG. 10, since the shaft 5 is non-magnetic, the following variables are set larger in order to increase the proportion of magnetic material. The L widths in q-axis direction are: a width of magnetic circuit 70a between the slit 62a and slot 62b; a width of magnetic circuit 70b between the slit 62b and slot 62c; a width of magnetic circuit 70c between the slit 62c and the slits and slot 62d; and the M width of magnetic rotor core 1 between the shaft 5 and the slit 62a.

Henceforth, if the non-magnetic material is used to make the shaft 5 as in the present embodiment, then the widths L and the width M are increased as shown in FIG. 11. Therefore, the strength of the rotor is secured and deformation of the rotor core 1 that results from punching is prevented. In addition to that, since the width M that supports the shaft 5 is also increased, therefore, the tolerance strength of the shaft also improves. The shaft 5 does not come apart from the rotor 30 during operation. Highly efficient synchronous motor is obtained.

Figure 12:
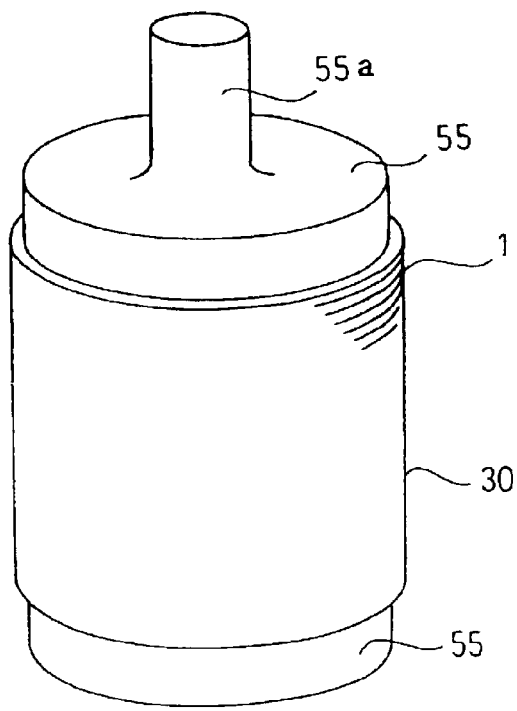
FIG. 12 shows an oblique view of another rotor of the embodiment 2.
Figure 13:
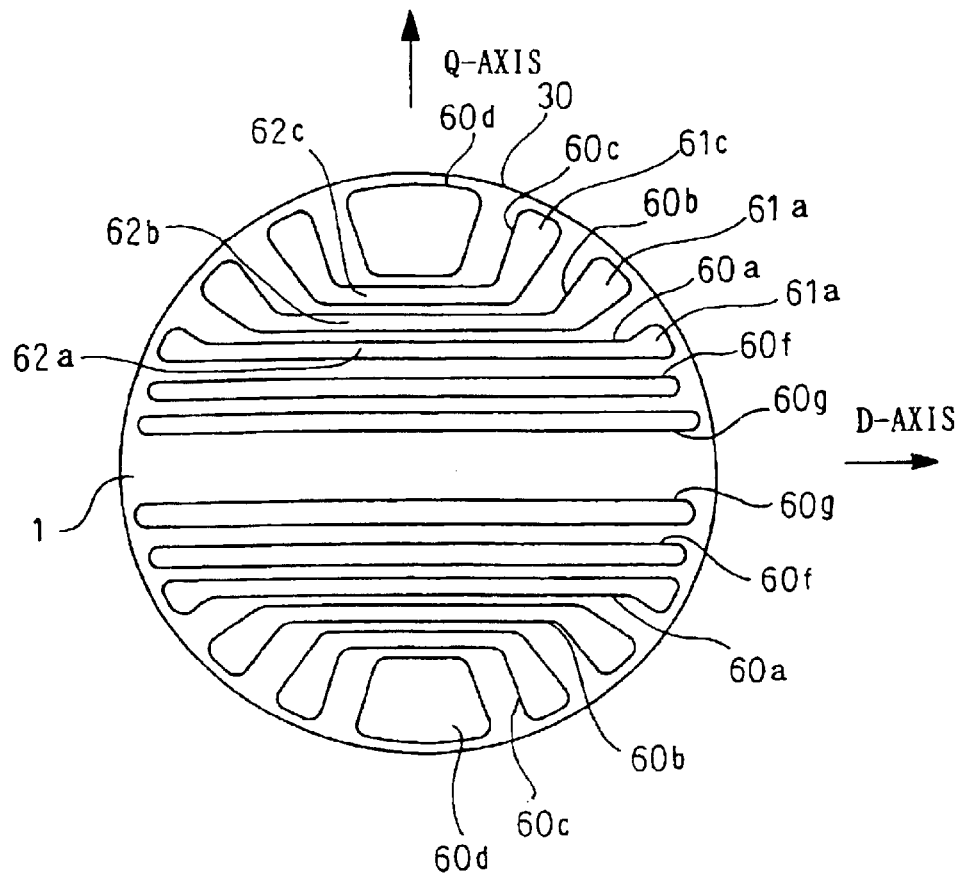
FIG. 13 shows a sectional view of another rotor of the embodiment 2.
Figure 14:
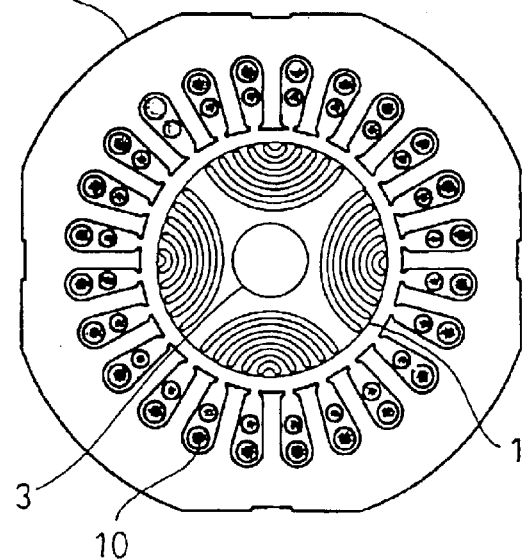
FIG. 14 shows a cross-sectional view of the 4-pole synchronous motor of the related art.
Figure 15:
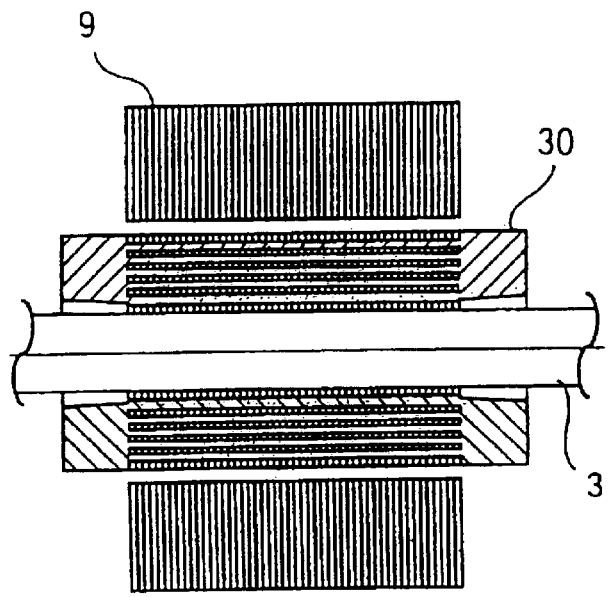
FIG. 15 shows a vertical section of the synchronous motor of the related art of FIG. 14.
Figure 16:
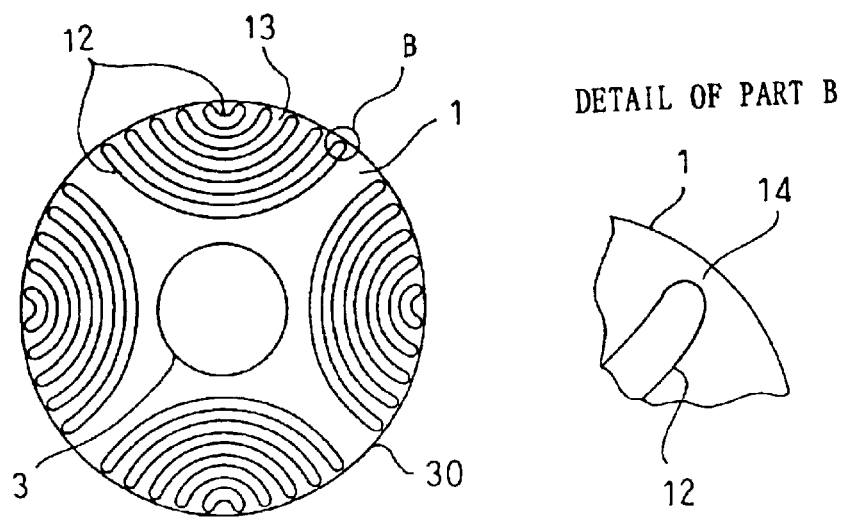
FIG. 16 shows a cross-sectional view of the synchronous motor of the related art of FIG. 14.

The drawing of FIG. 12 shows an oblique view of the rotor of the embodiment 2. The drawing of FIG. 13 shows a sectional view of the rotor of the embodiment 2. Refer to the embodiment 1 for the description of equivalent reference numerals of FIGS. 12 and 13. Referring to FIG. 12, the reference numeral 1 denotes a rotor core. The rotor core 1 is laminated and stacked in the axial direction to configure the rotor 30. The reference numeral 55 denotes the end rings mounted on both ends of the laminated rotor core 1 in the axial direction. The end rings 55 are composed of non-magnetic material such as aluminum. The end rings 55 and a shaft 55a together are molded to one body by using the die-casting method. In addition to that, referring to FIG. 13, the reference numerals 60a, 60b, 60c, and 60d denote the pairs of slits and slots with respect to the d-axis. As described in the embodiment 1, these include the slits 62a, 62b, and 62c and the slots 61a, 61b, and 61c. The pairs of slits and slots and the end rings 55 together are molded to one body by using the die-casting method.

The shaft 55a and the end rings 55a made of non-magnetic aluminum and stainless steel materials are molded together to form a single body. This being the case, there is no need to insert the shaft 55a to the rotor core 1. Therefore, as illustrated in FIG. 13, the rotor core 1 shows no shaft. The slits and slots 66f and 60g can be installed to the part where there was a shaft before. Henceforth, the proportion of the non-magnetic material to the magnetic material is ideally set to the pre-determined proportion (the ideal proportion of magnetic material to non-magnetic material is set as 1~3:1).

In other words, in order to set the pre-determined proportion as 1~3:1, the following variables must be adjusted: the widths of the slits and slots 60a, 60b, 60c, 60d, 60f, and 60g which are the non-magnetic part in the q-axis direction; and the width between the slits and slots 60a, 60b, 60c, 60d, 60f, and 60g which are the magnetic part of the rotor core 1. At this time, the widths between the slits and slots 60a, 60b, 60c, 60d, 60f, and 60g can be set large thereby does not deform upon punching them. The widths are set to the values that can provide a sufficient strength to the rotor. This secures reliability, at the same time, ensures the maximum operating efficiency of the synchronous motor.

As described above, by forming the shaft 55a using the non-magnetic material and by molding it together with the end rings 55a by using the die-casting method, then there is no need to insert the shaft 55a to the rotor core 1. The slits and slots 66f and 66g can be constructed to a part where there was a shaft before. The proportion of the magnetic material to the non-magnetic material in the q-axis direction that is the direction where the magnetic flux is difficult to flow can be set to the pre-determined proportion. The synchronous motor having the maximum operating efficiency is obtained. In addition to that, there is no need to install the shaft 55a to the rotor core 1, therefore, the slits and slots 60f and 60g can be constructed to a part where there was a shaft before. This way, the widths between the slits and slots can appropriately be set to ensure the strength of the rotor and a highly reliable synchronous motor is obtained this way.

In addition to that, an example of using aluminum as the filler material, which is non-magnetic, is described. However, another non-magnetic material such as conductive aluminum by using the die-casting method. The slit is replenished with anther material such as copper by using the die-casting method. In this case, the slit is covered so that the filler material of the slot does not intrude the slit. After covering the slit, the slot is replenished with another filler material. The slit and slot are replenished with different materials accordingly. In this case, the material to be replenished to the slit does not have to be conductive.

In addition to that, in the present embodiment, the filler material of the slits is described as non-magnetic. The same effect is obtained by replenishing the slit with magnetic material such as magnet that has a small magnetic permeability. The magnet used to replenish the slit is unevenly processed. The slit is also unevenly processed so that they are easily attached.

The slits and slots are replenished with different materials accordingly. This expands on the selection criteria in the range of materials that can be used. The synchronous motor is cost effective this way, and the characteristics of a synchronous motor expand. By separating the slits and the slots beforehand and by replenishing them with different materials, there is no need to cover them upon replenishment, so that the easy manufacturing synchronous motor is obtained which is likely to be less expensive.

In addition to that, in the present embodiment, the slits and slots are joined together in a continuous curve. The same effect is obtained even by installing a compression between the slits and slots, as well, even by separating the slits and slots. In addition to that, the die-casting method and the forging method are used as a method of replenishing the filler material such as aluminum. These methods make the replenishing process easy regardless of versatile shapes of the slits and slots.

Now, in the present embodiment of the described case have 4 pairs of slits and slots. The same effect is obtained even if this number is not 4. In addition to that, the conductive aluminum material is described in this case. Other materials such as copper, copper alloys, brass, and stainless steel may be used to obtain the same effect. For instance, when the copper is used as the conductive material, since the copper has low resistivity than aluminum, the resistance of the squirrel-cage secondary conductor is minimized. The characteristic from start-up to pulling into synchronism is improved.

In addition to that, as described in the embodiment 1, the low magnetic resistance parts (such as narrow unit and connector bridge unit described in the embodiment 1) are installed to the slit on one side of the q-axis. By arranging the shape of the slit asymmetrical with respect to the q-axis, the magnetic flux 8 is controlled to jump over the specific position (that is, the minimum resistance part) of the efficient synchronous motor. The flow of magnetic flux is improved. The efficiencies and characteristics of the motor are improved. In addition to that, the low magnetic resistance part (that is, the narrow part or connector bridge unit described in the embodiment 1) is installed in the rotating and progressing direction side with respect to the q-axis of the slit. The flow of magnetic flux is smoothened. This reduces losses and highly efficient synchronous motor is obtained.

In addition to that, by having the low magnetic resistance parts (such as narrow unit and connector bridge unit) at the position of minimum loss of the magnetic circuits 70a, 70b, and 70c between the slits, the magnetic flux 8 generated at the stator 9 passes through the low magnetic resistance parts. The flow of magnetic flux is controlled to the specific position, namely the minimum loss position. The flow of magnetic flux is improved. The efficiencies and characteristics of the synchronous motor are improved. In addition to that, by having the low magnetic resistance part (that is, the connector bridge unit), the strength of the rotor 30 is improved. The strength against the centrifugal force is improved. The synchronous motor reliability increases. Herewith, the ideal position of the connector bridge unit is away from the q-axis as much as possible in the rotating and progressing direction side.

In addition to that, the synchronous motor that utilizes the rotor core 1 can operate at the optimum efficiency because the secondary copper loss of the rotor 30 does not occur when operating at synchronous motion. The suitable applications of the present embodiment are fans, compressors, air-conditioners, and refrigeration and air-conditioning machines.

In addition to that, according to the synchronous motor of the present embodiment, the conductive material being used has a low resistivity. This can shorten the time taken from the start-up to reach pulling into synchronism. The performance is favored. This minimizes the noise and vibration of the synchronous motor. Applying this synchronous motor to the compressor can minimize the noise and vibration occurrences. In addition to that, since the synchronous motor of the present embodiment and the compressor applying this synchronous motor has low vibration, therefore, when applied to the refrigeration and the air-conditioning machine, highly reliable refrigeration and air-conditioning machines without fractures or vibration occurring in the piping system are obtained. In addition to that, since the compressor equipping this synchronous motor of the present embodiment has minimum vibration and noise, when applied to the refrigeration and the air-conditioning machines, the protection units such as vibration proofing device and soundproofing device are not necessary. Reliable, cost-effective refrigeration and air-conditioning machines are obtained.

A synchronous motor of the preferred embodiment comprises at least a pair of slits constructed on a rotor, for forming a salient pole for obtaining a d-axis which is a direction in which a magnetic flux is easy to flow and a q-axis which is a direction in which the magnetic flux is difficult to flow. The slits are asymmetrically aligned with respect to the q-axis by installing to the slits a low magnetic resistance parts having a low magnetic resistance. The position of the magnetic flux flow is controlled to the specific position. The highly efficient electric motor having reduced the loss is obtained.

A synchronous motor of the preferred embodiment comprises at least a pair of slits constructed on a rotor, which are replenished with a conductive material, for forming a salient pole for obtaining a d-axis which is a direction in which the magnetic flux is easy to flow and a q-axis which is a direction in which the magnetic flux is difficult to flow; and a plurality of slots connected to at least one end of the slit in a d-axis direction, which are arranged at periphery of the slit, which are replenished with a conductive material, and for developing an induction torque. The slits are asymmetrically aligned with respect to the q-axis by installing to the slits a low magnetic resistance parts having a low magnetic resistance. The position of the magnetic flux flow is controlled to the specific position. The highly efficient electric motor having reduced the loss is obtained. Furthermore, because the synchronous motor has slots, it is operated without relying on the special start-up device in starting the synchronous motor. A low-cost synchronous motor is possible.

The synchronous motor of the preferred embodiment has the low magnetic resistance parts which are constructed by changing a widths of the slits. Simply by modifying the widths of the slits, the magnetic flux is flown to the minimum loss position. The synchronous motor having the maximum operating efficiency is obtained.

The synchronous motor of the preferred embodiment has a connector bridge unit that connects the magnetic circuits between the slits formed by dividing the slits. The connector bridge unit is the low magnetic resistance part. Although it is an easily made structure of dividing the slits, the position where the magnetic flux flows is controllable. The synchronous motor having the maximum operating efficiency is obtained. In addition to that, the connector bridge unit improves the strength against the centrifugal force. A highly reliable synchronous motor is obtained.

The synchronous motor of the preferred embodiment has a plurality of the connector bridge units. Widths of the connector bridge units are gradually changed in a d-axis direction. It becomes difficult to generate the saturation of magnetic flux. The synchronous motor having the maximum operating efficiency is obtained.

The synchronous motor of the preferred embodiment connects the adjacent slits of the slits and slots. This way, a plenty of filler materials such as aluminum is used so that the secondary resistance of the rotor is declined. The synchronous motor having the maximum operating efficiency is obtained.

The synchronous motor of the preferred embodiment installs the low magnetic resistance parts at the rotating and progressing direction side with respect to the q-axis. The flow of magnetic flux is smoothened. This reduces losses and highly efficient synchronous motor is obtained.

The synchronous motor of the preferred embodiment sets a proportion of other parts beside the slits and slots in a q-axis direction as 1:1~3. The synchronous motor having the maximum operating efficiency is obtained.

A synchronous motor of the preferred embodiment comprises a rotor formed by laminating the rotor core, and formed by punching the magnetic material; and at least a pair of slits constructed on the rotor, which are replenished with a non-magnetic material, for forming a 2-pole salient pole having an angle between the d-axis and the q-axis of approximately 90 degrees. The proportion of the magnetic material to the non-magnetic material in a q-axis direction is set to a pre-determined proportion in order to minimize the loss of electric motor. This reduces loss of the rotor and highly efficient synchronous motor is obtained.

The synchronous motor of the preferred embodiment sets the pre-determined proportion to approximately to 1~3:1. Various losses of the rotor is decreased and well-balanced out. The synchronous motor having the maximum operating efficiency is obtained.

The synchronous motor of the preferred embodiment comprises slots constructed on the rotor for developing an induction torque. It is operated without relying on the special start-up device in starting the synchronous motor. A low-cost synchronous motor is possible.

The synchronous motor of the preferred embodiment comprises a shaft for transmitting a rotational force of the rotor. The shaft is made of a non-magnetic material. This expands on the selection criteria in the range of materials that can be used. The performance of the synchronous motor is improved.

The synchronous motor of the preferred embodiment comprises an end ring attached to an end of the rotor in its axial direction. The shaft and the end rings are molded as one body. The shapes of the slits are versatile. Highly efficient synchronous motor is obtained by choosing the shape with minimum secondary resistance.

A synchronous motor of the preferred embodiment sets a pole number to 2-pole. The number of rotation during synchronous operation is 3000 rpm or 3600 rpm. The high output synchronous motor having a large number of revolutions is attained.

A fan of the preferred embodiment comprises a synchronous motor which is defined in the claims 1 to 14. The fan equipped with the synchronous motor of the preferred embodiment has low noise and minimum vibration. A highly reliable fan is obtained.

A compressor of the preferred embodiment comprises a synchronous motor which is defined in the claims 1 to 14. The compressor equipped with the synchronous motor of the preferred embodiment has low noise and minimum vibration. A highly reliable compressor is obtained.

The refrigeration and air-conditioning machines of the preferred embodiment comprises a fan which is defined in the claim 15 and a compressor which is defined in the claim 16. The refrigeration and air-conditioning machines equipped with the fan and compressor of the preferred embodiment do not require the vibration proofing device or the soundproofing device. Reliable, cost-effective refrigeration and air-conditioning machines are obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronous motor, comprising:
    at least a pair of slits constructed on a rotor, for forming a salient pole for obtaining a d-axis which is a direction in which a magnetic flux is easy to flow and a q-axis which is a direction in which the magnetic flux is difficult to flow,
    wherein low magnetic resistance parts are provided in the pair of slits in order that the slits are asymmetrically aligned with respect to the q-axis, and wherein the low magnetic resistance parts are constructed by varying a width of the slits.

2. A synchronous motor, comprising:
    at least a pair of slits constructed on a rotor, which are filled with a conductive material, for forming a salient pole for obtaining a d-axis which is a direction in which a magnetic flux is easy to flow and a q-axis which is a direction in which the magnetic flux is difficult to flow; and
    a plurality of slots connected to at least one end of the slit in a d-axis direction, which are arranged at periphery of the slit, which are filled with a conductive material, and for developing an induction torque,
    wherein low magnetic resistance parts are provided in the pair of slits in order that the slits are asymmetrically aligned with respect to the q-axis, and wherein the low magnetic resistance parts are constructed by varying a width of the slits.

3. The synchronous motor according to claim 1, further comprising a connector bridge unit that magnetically connects the slits formed by dividing the slits, wherein the connector bridge unit is the low magnetic resistance part.

4. The synchronous motor according to claim 3 comprising a plurality of the connector bridge units;
wherein widths of the connector bridge units are gradually changed in a d-axis direction.

5. The synchronous motor according to claim 1, comprising:
a plurality of slits; and
wherein the adjacent slits of the plurality of slits are connected in a q-axis direction.

6. The synchronous motor according to claim 1, wherein the low magnetic resistance parts are provided at a direction of rotating of the motor.

7. The synchronous motor according to claim 1, wherein a ratio of non-magnetic material to magnetic material is between 1:1 and 1:3 in a q-axis direction.

8. A synchronous motor, comprising:
a rotor formed by laminating a rotor core, and formed by punching the magnetic material;
at least a pair of slits constructed on the rotor, which are filled with a non-magnetic material, for forming a 2-pole salient pole having an angle between the d-axis and the q-axis of approximately 90 degrees; and
slots constructed on the rotor for developing an induction torque,
wherein a proportion of the magnetic material to the non-magnetic material in a q-axis direction is set to a pre-determined proportion for minimizing a loss in efficiency of electric motor,
wherein the pre-determined proportion is approximately between 1:1 and 3:1,
wherein the slits are asymmetrically aligned with respect to the a-axis, and
wherein the low magnetic resistance parts are constructed by varying a width of the slits.

9. The synchronous motor according to claim 1, further comprising: a shaft for transmitting a rotational force of the rotor, wherein the shaft is made of a non-magnetic material.

10. The synchronous motor according to claim 9, further comprising:
an end ring attached to an end of the rotor in its axial direction,
wherein the shaft and the end ring are molded as one body.

11. A synchronous motor according to the claim 1, wherein the motor is a two pole motor.

12. A fan, comprising: the synchronous motor of claim 1.

13. A compressor, comprising: the synchronous motor of claim 1.

14. A refrigeration and air-conditioning machines, comprising: the fan of claim 12.

15. A refrigeration and air-conditioning machines, comprising: the compressor of claim 13.

16. The synchronous motor according to claim 1, wherein the slits are asymmetrically aligned with respect to the q-axis along an entire length of a core of the rotor.

17. The synchronous motor according to claim 2, wherein the slits are asymmetrically aligned with respect to the q-axis along an entire length of a core of the rotor.

18. The synchronous motor according to claim 8, wherein the slits are asymmetrically aligned with respect to the q-axis along an entire length of the rotor core.

19. A synchronous motor, comprising:
a pair of slits constructed on a rotor, which are filled with a conductive material, for forming a salient pole for obtaining a d-axis which is a direction in which a magnetic flux is easy to flow and a q-axis which is a direction in which the magnetic flux is difficult to flow, both slots of the pair of slots are substantially linear; and
a first slot connected to an end of one slit of the pair of slits and a second slot connected to an end of another slit of the pair of slits, the first slot and the second slot are filled with a conductive material and are configured to develop an induction torque,
wherein said first slot extends at an angle from the end of the one slit and the second slot extends at an angle from the end of the another slit.

20. The synchronous motor according to claim 19, wherein said first slot extends in a substantially radial direction from a shaft of the motor, and wherein the second slot extends in a substantially radial direction from the shaft of the motor.

* * * * *